(12) United States Patent
Ito

(10) Patent No.: US 6,356,526 B1
(45) Date of Patent: Mar. 12, 2002

(54) OPTICAL DEVICE

(75) Inventor: Shin Ito, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/522,589

(22) Filed: Mar. 10, 2000

(30) Foreign Application Priority Data

Mar. 12, 1999 (JP) .......................................... 11-066762

(51) Int. Cl.[7] ................................................. G11B 7/12
(52) U.S. Cl. ...................................................... 369/244
(58) Field of Search ................................ 369/244, 215, 369/219

(56) References Cited

U.S. PATENT DOCUMENTS 5,790,511 A * 8/1998 Juso et al. .................. 369/244
6,185,180 B1 * 2/2001 Morishita ................... 369/244
6,285,650 B1 * 9/2001 Park ........................... 369/244

FOREIGN PATENT DOCUMENTS

JP 6-162538 * 6/1994 ................. 369/244
JP 6-243601 * 9/1994 ................. 369/244

* cited by examiner

*Primary Examiner*—Allen Cao
(74) *Attorney, Agent, or Firm*—Pillsbury Winthrop LLP

(57) ABSTRACT

In an optical device, first, second and third reference axes intersect at right angles with each other at a predetermined point and a first reference plane is defined by the first and second reference axes with a second reference plane defined by the second reference axis and third reference axis. Frame, functioning as a support, has first and second supporting surfaces extending along first and second reference planes extending along the first reference plane and a third supporting surface extending along the second reference plane. Sensor lens has first, second and third support arms extending radially outward from its periphery. These support arms of the sensor lens have their respective side surfaces pressed, via a leaf spring, against the first, second and third support arms, respectively, and the sensor lens is supported by the frame in such a manner that the center of the sensor lens conforms with the optical axis. Such arrangements can reliably avoid an optical axis deviation that would result from any possible thermal expansion or contraction of the sensor lens.

4 Claims, 4 Drawing Sheets

PRIOR ART  PRIOR ART

OPTICAL DEVICE

BACKGROUND OF THE INVENTION

The present invention relates generally to optical devices, such as sensor lens units for use in optical pickups of optical disk devices, and more particularly to an improved optical device which can reliably avoid an undesirable optical axis deviation resulting from thermal expansion or contraction of an optical body such as a lens.

Optical pickups employed in optical disk devices, such as CD, CD-R, CD-RW, CD-WO and DVD recording/reproduction devices, generally comprise various optical components including a laser diode, photodetector, half mirror and lens which are all incorporated within a predetermined frame. These optical components must be set in place accurately without any deviations of their optical axes and focal points.

For reduction in the costs and weights of the optical components, some of the conventional optical devices employ, in place of a traditional glass lens, a polycarbonate lens integrally formed with a mirror cylinder. FIGS. 7A and 7B are diagrams showing a typical manner in which such a lens integrally formed with a mirror cylinder is fixed within the frame. Namely, the integrated or one-piece structure 5 of the lens 3 and the mirror cylinder 4 surrounding and thereby protecting the lens 3 is inserted in a groove 2 that is formed in the die-cast frame 1 and defined by a slanted wall surface of the frame 1. In this way, the lens 3 is accurately positioned relative to the frame 1 and firmly secured to the frame 1 by means of an adhesive 6.

Further, it is generally necessary to guarantee an appropriate operating environment of the optical pickups in a wide temperature range. However, because the one-piece structure of the lens and the mirror cylinder is unremovably fixed directly to the frame by the adhesive, the conventionally-known optical devices encounter the problem that the center (optical axis) of the lens would undesirably deviate as the lens thermally expands or contracts, as shown in FIG. 7B. Particularly, because the polycarbonate lens has a very high thermal expansion coefficient as compared to the traditional glass lens, its optical axis deviation would exert non-negligible adverse influences upon a light detection unit of the disk recording/reproduction device.

SUMMARY OF THE INVENTION

In view of the foregoing, it is an object of the present invention to provide an improved optical device which can reliably avoid an optical axis deviation that would result from any possible thermal expansion or contraction of an optical component employed therein.

In order to accomplish the above-mentioned object, the present invention provides an optical device which comprises: a support having at least two supporting surfaces extending along at least two reference planes intersecting each other along a predetermined intersection line; an optical component including an optical body and at least two support arms extending outward from a periphery of the optical body, one of the support arms having one side surface abutting against one of the supporting surfaces, the other support arm having one side surface abutting against the other supporting surface, the optical component being supported by the support in such a manner that an optical axis of the optical body conforms with the intersecting line; securing means that presses the one side surface of each of the support arms against a corresponding one of the supporting surfaces, to thereby secure the optical component to the support in a half-fixed manner.

According to the present invention, the at least two support arms extending outward from the optical body are supported by the support in a half-fixed manner by being pressed against the corresponding supporting surfaces of the support. The at least two support arms of the optical component, as well as the corresponding supporting surfaces of the support, extend along at least two reference planes that intersect with each other at the optical axis of the optical component. Therefore, by the support arms of the optical component being pressed against the corresponding supporting surfaces, the optical axis of the optical component can be placed to positionally conform with the intersection line of the reference planes. Thus, as the optical component thermally expands or contracts, the support arms of the optical component, which are pressed against and half-fixed to the corresponding supporting surfaces of the support, are caused to move radially outward away from the optical axis along the supporting surfaces to thereby accommodate any dimensional deviation of the optical component due to the thermal expansion or contraction of the optical component. As a consequence, the present invention can reliably avoid an undesirable positional deviation of the optical axis.

In a preferred implementation of the present invention, the support includes three supporting surfaces and the optical component includes three support arms. Namely, assuming that first, second and third reference axes intersect at right angles with each other at a predetermined point and that a first reference plane is defined by the first and second reference axes and a second reference plane is defined by the second reference axis and third reference axis, the optical device of the present invention comprises: a support having first and second supporting surfaces extending along first and second reference planes extending along the first reference plane and a third supporting surface extending along the second reference plane, an optical component including an optical body and first, second and third support arms extending outward from a periphery of the optical body, the first support arm having one side surface abutting against the first supporting surface, the second support arm having one side surface abutting against the second supporting surface, the third support arm having one side surface abutting against the third supporting surface, the optical component being supported by the support in such a manner that the optical axis of the optical body conforms with the second reference axis; and securing means that presses the one side surfaces of the first, second and third support arms against the first, second and third supporting surfaces, respectively, to thereby secure the optical component to the support in a half-fixed manner.

In this invention, it is preferable that the distal and proximal ends of the first and second support arms be resiliently joined with each other, and that the distal ends of the first and second support arms be firmly secured to the first and second supporting surfaces, respectively while the proximal ends of the first and second support arms are secured to the first and second supporting surfaces, respectively, in a half-fixed manner.

If the positions of the distal ends of the first and second support arms which are secured to the first and second supporting surfaces deviate by a predetermined distance from optical-axial reference positions of the optical body, then the reference position of the optical component may deviate along the direction of the optical axis under the thermal influence. Thus, according to the present invention, the reference position of the optical component is intentionally set to deviate so as to accommodate any possible thermal influence on the optical component, with the result

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE PREFERRED EMBODIMENTS

Figure 1:
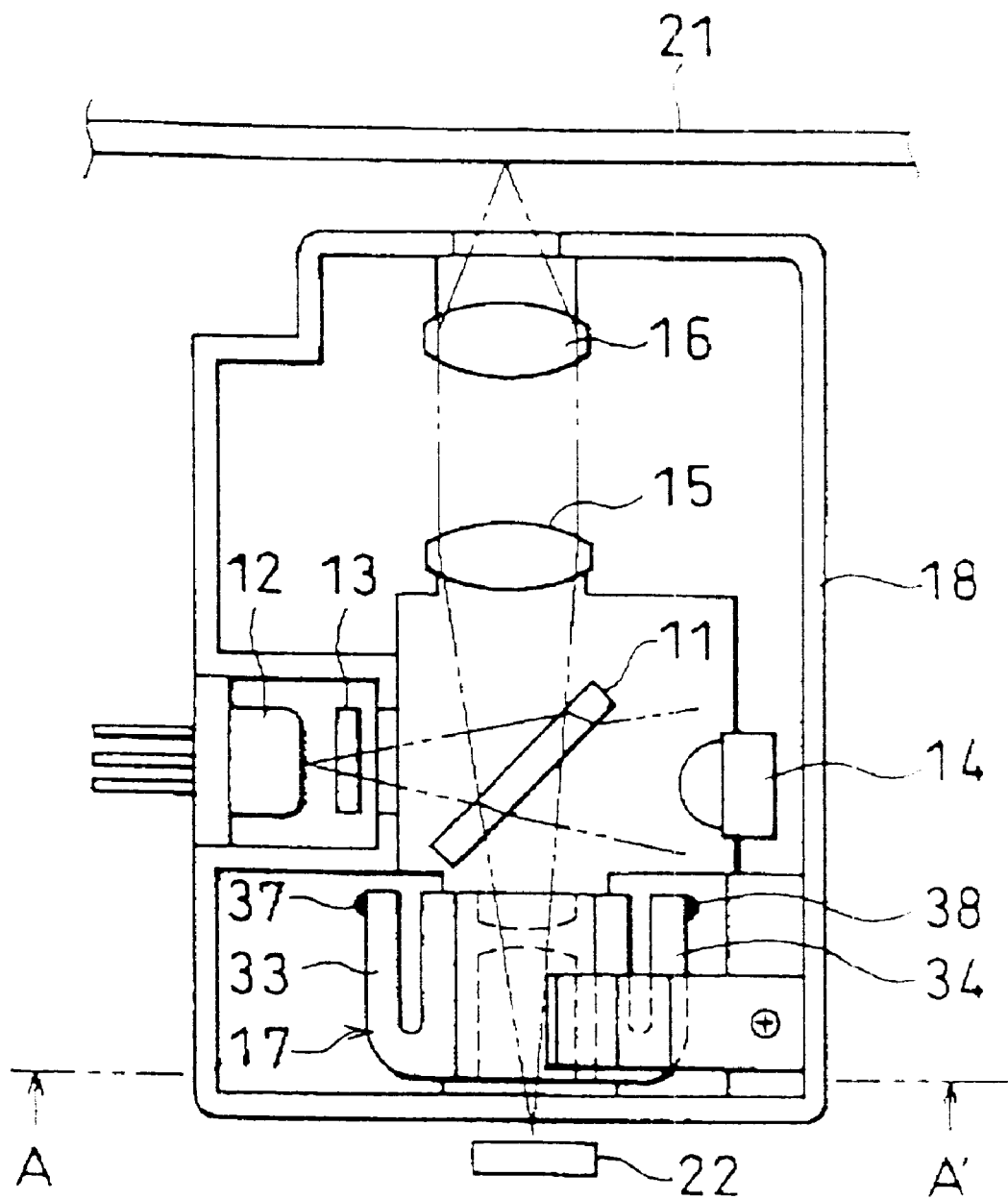
FIG. 1 is a schematic view of an optical pickup in accordance with a preferred embodiment of the present invention.

Referring first to FIG. 1, there is shown a schematic view of an optical pickup in accordance with a preferred embodiment of the present invention. The optical pickup includes a central half mirror 11, a laser diode 12 and a diffraction grating 13 both disposed to the left of the half mirror 11, and a monitoring photodiode 14 disposed to the right of the half mirror 11. The optical pickup also includes a collimating lens 15 and an object lens 16 both disposed above the half mirror 11 and a sensor lens unit 17 positioned below the half mirror 11. These components 11, 12, 13, 14, 15, 16 and 17 are all housed, in predetermined positional relation to each other, within a frame 18 formed by die casting or otherwise.

Laser light beam emitted from the laser diode 12 is diffracted via the diffraction grating 13 to be split into three light beams. Part of the three light beams passes through the half mirror 11 and detected by the monitoring photodiode 14 for light power control. The remaining part of the three light beams is reflected off the half mirror 11 and imaged or focused onto an optical disk 21 via the collimating lens 15 and object lens 16. Reflection off the optical disk 21 passes sequentially through the object lens 16, collimating lens 15 and half mirror 11 and is then imaged onto a four-quadrant photodetector 22 via the sensor lens unit 17.

Figure 2:
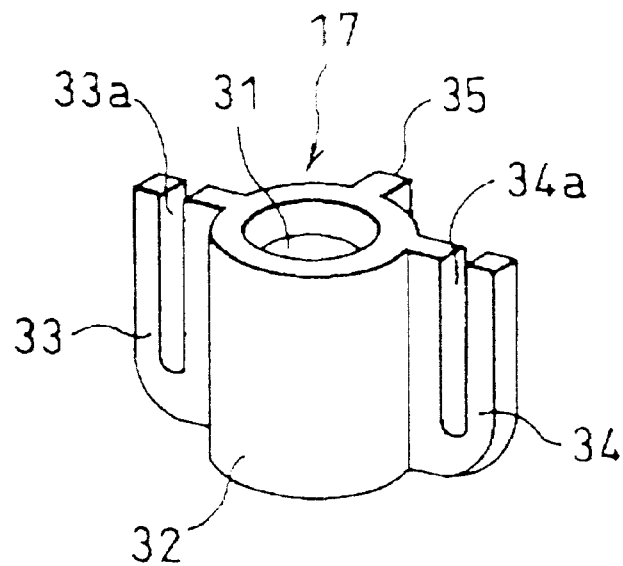
FIG. 2 is a perspective view showing details of a sensor lens unit employed in the optical pickup of FIG. 1.

FIG. 2 is a perspective view showing details of the sensor lens unit 17. The sensor lens unit 17 is a one-piece structure formed of polycarbonate resin, which integrally includes a concave lens 31 as an optical body (i.e., principal optical member) of the lens unit 17, a mirror cylinder 32 surrounding and protecting the concave lens 31, and three support arms 33, 34 and 35 projecting radially outward from the a mirror cylinder 32. The support arms 33 and 34 each have a vertical slit 33a, 33b extending from the top toward the lower end thereof so that the distal end portions of the support arm 33, 34 can be resiliently deformed relative to the proximal end portions.

Figure 3:
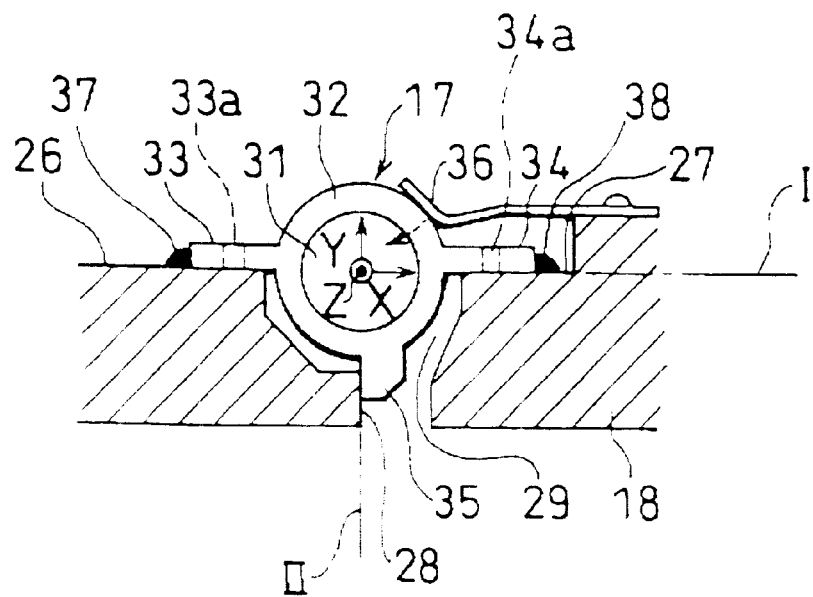
FIG. 3 is a cross-sectional view along the line A–A' of FIG. 1.

FIG. 3 is a cross-sectional view taken along the line A–A' of FIG. 1, showing in detail how the sensor lens unit 17 is fitted within the frame 17. For convenience of description, lets assume that the center of the concave lens 31 is an origin point where X, Y and Z axes intersect at right angles with each other and the Z axis conforms with the optical axis. Further, a plane defined by the X and Z axes will be referred to as a first reference plane I and a plane defined by the Y and Z axes will be referred to as a second reference plane II. In the illustrated example, the frame 18, functioning as a support of the sensor lens unit 17, has first and second supporting surfaces 26 and 27 extending along the first reference plane I and a third supporting surface 28 extending along the second reference plane II. The frame 18 also has a groove 29 in which almost a half of the mirror cylinder 32 is received in a non-contact fashion. The sensor lens unit 17 is secured to the frame 17 with one side surfaces of the support arms 33 and 34 abutting against the first and second supporting surfaces 26 and 27, respectively, of the frame 18 and one side surface of the support arm 35 abutting against the third supporting surface 28. Also, the sensor lens unit 17 is normally urged, via a leaf spring 36 fixed at one end to the frame 18 as a resilient securing means, in an arrowed direction between the X and Y axis. Further, the distal ends of the support arms 33 and 34 are firmly fixed to the first and second supporting surfaces 26 and 27, respectively, of the frame 18 by means of adhesives 37 and 38, so as not to fall off the frame 18.

Figure 4:
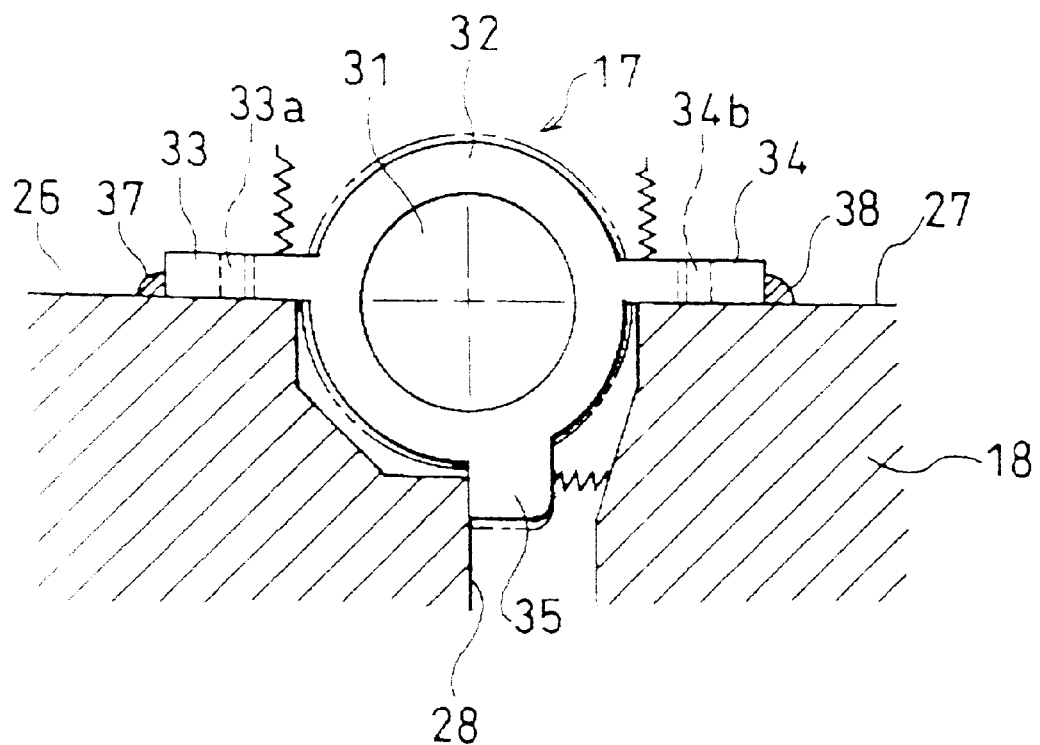
FIG. 4 is a view explanatory of operation of the optical pickup of FIG. 1.

With the above-mentioned arrangements, the support arms 33 and 34 are resiliently pressed, via the leaf spring 36, against the supporting surfaces 26 and 27, which also causes the other support arm 35 to be resiliently pressed against the supporting surface 28, as shown in FIG. 4. In this manner, the center of the sensor lens unit 17 is accurately positioned at the location of the optical axis. In case the concave lens 31 and mirror cylinder 32 thermally expand as depicted by phantom lines in FIGS. 4 and 5, the proximal end portions of the support arms 33 and 34 are caused to move radially along the supporting surfaces 26 and 27 against the bias of the leaf spring 36, during which time the support surface 35 is also caused to move along the supporting surface 28. Because the support arms 33 and 34 are fixed at their distal ends by means of the adhesives 37 and 38, the displacement of the proximal end portions of the support arms 33 and 34 due to the thermal expansion of the concave lens 31 and mirror cylinder 32 can be accommodated by the vertical slits 33a and 33b. In this case, the optical axis of the concave lens 31 does not change in position because the thermal expansion occurs only in a radial direction from the center of the lens 31.

Figure 5:
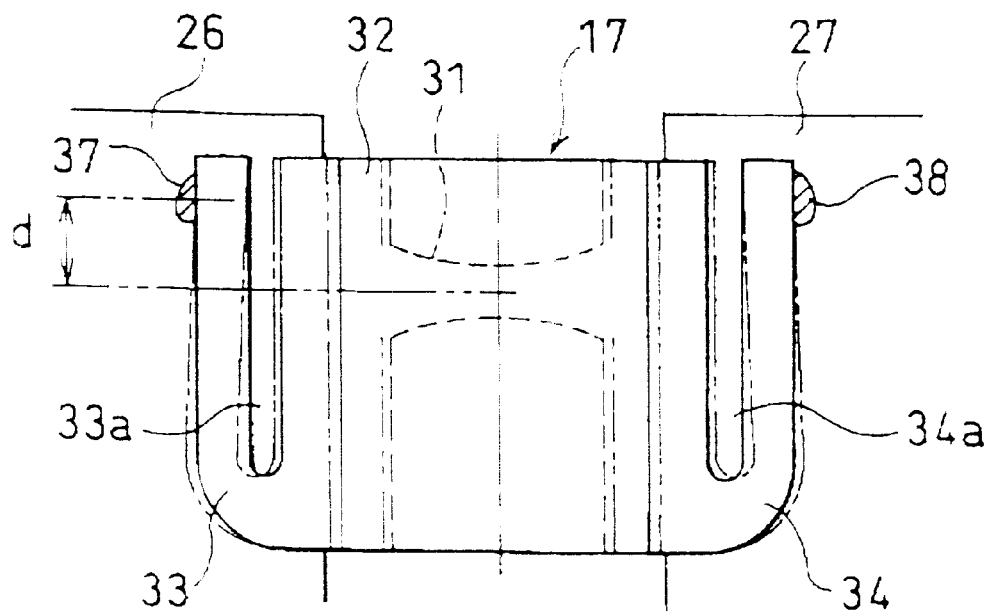
FIG. 5 is also a view explanatory of operation of the optical pickup of FIG. 1.

Further, in this embodiment, as shown in FIG. 5, the distal ends of the support arms 33 and 34, which are unremovably secured to the supporting surfaces 26 and 27 by means of the adhesives 37 and 38, are offset from the horizontal center line of the concave lens 31 by a distance "d" in the direction of the optical axis. Therefore, the thermal expansion/contraction will displace the optical-axial position of the concave lens 31 by an amount of "d×thermal expansion coefficient×$\Delta$Tm (temperature difference)". Thus, the thermal characteristics of the entire optical pickup can be further improved by intentionally creating a deviation in advance that can accommodate the optical-axial deviations of the half mirror 11, collimating lens 15, object lens 16 and the like.

Figures 6A, 6B:
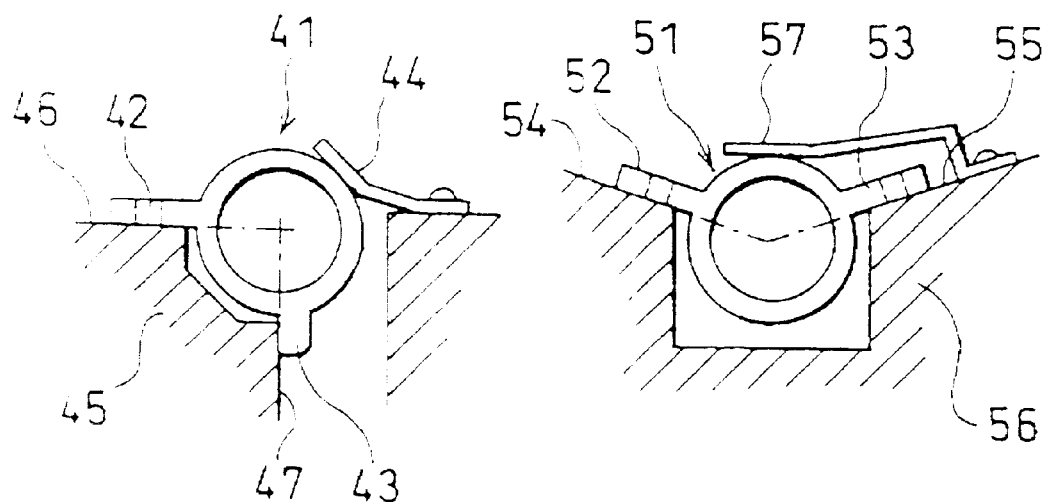
FIGS. 6A and 6B are views showing modifications of the optical pickup of the present invention.
Figures 7A, 7B:
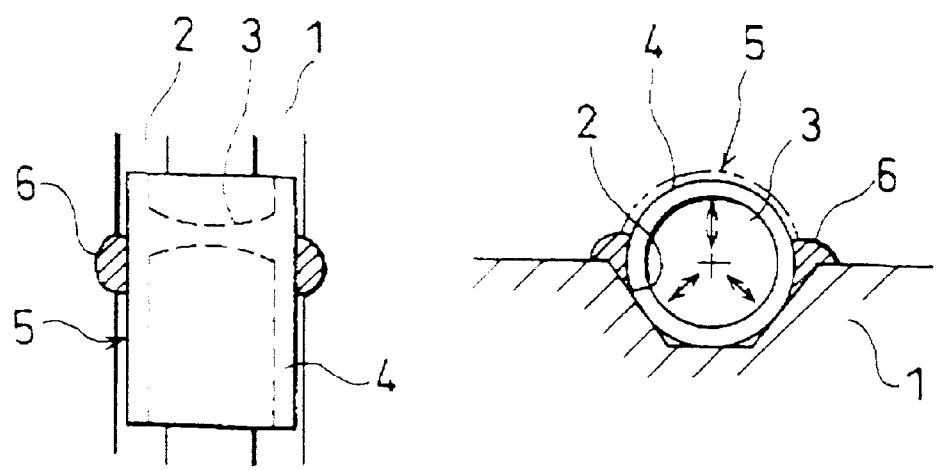
FIGS. 7A and 7B are views showing how an optical component in a conventional optical pickup is fitted in a frame.

In the above-described preferred embodiment of the present invention, the sensor lens unit 17 is secured to the frame 18 by resiliently pressing the three support arms 33, 34 and 35, with pairs of the arms 33 and 35 and the arms 35 and 34 each forming a 90° angle, against the three supporting surfaces 26, 27 and 28, respectively. However, the present invention is not so limited; for example, only two (rather than three) support arms may be formed on the sensor lens unit 17 and only two supporting surfaces may be provided on the frame 18 in such a way that the support arms and supporting surfaces extend toward the optical axis of the concave lens 13, i.e., the optical body. FIGS. 6A and 6B show such modified embodiments of the invention. Namely, the sensor lens unit 41 shown in FIG. 6A has two support arms 42 and 43 extending toward the optical axis at right angles with each other, and the frame 45 has two supporting surfaces 46 and 47 extending toward the optical axis at right angles with each other. Further, the support arms 42 and 43 of the sensor lens unit 41 are supported by the supporting surfaces 46 and 47, respectively, of the frame 45 by being resiliently pressed via a leaf spring 44 against the respective supporting surfaces 46 and 47. Further, the sensor lens unit 51 shown in FIG. 6B has two support arms 52 and 53 extending along reference planes intersecting with each other at a non-90° angle, and similarly the frame 56 has two supporting surfaces 54 and 55 extending along the reference planes intersecting with each other at the non-90° angle. As in the other embodiments, the sensor lens unit 51 is resiliently pressed against the two supporting surfaces 54 and 55 of the frame 56 via a leaf spring 57 secured at one end to the frame 56.

As has been described so far, the present invention is characterized in that the support arms of the optical component are secured, in a half-fixed manner, to the supporting surfaces of the support extending along the directions of possible thermal expansion or contraction of the arms. Thus, as the optical component thermally expands or contracts, the support arms of the optical component are allowed to move radially outward away from the optical axis along the supporting surfaces of the support against the bias of the spring, to thereby accommodate a dimensional change of the optical component, which can reliably avoid a positional deviation of the optical axis.

What is claimed is:

1. An optical device comprising:

a support having at least two supporting surfaces extending along at least two reference planes intersecting each other along a predetermined intersection line;

an optical component including an optical body and at least two support arms extending outward from a periphery of said optical body, one of said support arms having one side surface abutting against one of said supporting surfaces, another of said support arms having one side surface abutting against another of said supporting surfaces, said optical component being supported by said support in such a manner that an optical axis of said optical body conforms with the intersecting line; and securing means that presses the one side surface of each of said support arms against a corresponding one of said supporting surfaces, to thereby secure said optical component to said support in a half-fixed manner.

2. An optical device comprising:

a support having first and second supporting surfaces extending along first and second reference planes extending along a first reference plane and a third supporting surface extending along a second reference plane, wherein said first reference plane is defined by first and second reference axes and said second reference plane is defined by said second reference axis and a third reference axis, said first, second and third reference axes intersecting at right angles with each other at a predetermined point;

an optical component including an optical body and first, second and third support arms extending outward from a periphery of said optical body, said first support arm having one side surface abutting against said first supporting surface, said second support arm having one side surface abutting against said second supporting surface, said third support arm having one side surface abutting against said third supporting surface, said optical component being supported by said support in such a manner that an optical axis of said optical body conforms with said second reference axis; and securing means that presses the one side surfaces of said first, second and third support arms against said first, second and third supporting surfaces, respectively, to thereby secure said optical component to said support in a half-fixed manner.

3. An optical device as claimed in claim 2 wherein distal and proximal ends of said first and second support arms are resiliently coupled with each other, and the distal ends of said first and second support arms are firmly secured to said first and second supporting surfaces, respectively, while the proximal ends of said first and second support arms are secured to said first and second supporting surfaces, respectively, in a half-fixed manner.

4. An optical device as claimed in claim 3 wherein positions of the distal ends of said first and second support arms which are secured to said first and second supporting surfaces deviate by a predetermined distance from optical-axial reference positions of said optical body.

* * * * *